United States Patent
Wang et al.

(10) Patent No.: US 6,925,171 B2
(45) Date of Patent: Aug. 2, 2005

(54) UNIVERSAL IMPEDANCE MATCHING NETWORK FOR THE SUBSCRIBER LINE INTEGRATED CIRCUITS

(75) Inventors: Minsheng Wang, Plano, TX (US); Richard K. Hester, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 439 days.

(21) Appl. No.: 10/159,524

(22) Filed: May 30, 2002

(65) Prior Publication Data

US 2002/0191638 A1 Dec. 19, 2002

Related U.S. Application Data

(60) Provisional application No. 60/295,633, filed on Jun. 4, 2001.

(51) Int. Cl.$^7$ .................................................. H04M 1/00
(52) U.S. Cl. ...................................... 379/398; 379/394
(58) Field of Search ................................ 379/398, 394, 379/399.01

(56) References Cited

U.S. PATENT DOCUMENTS 4,381,561 A    4/1983  Treiber

*Primary Examiner*—Jefferey F. Harold
(74) *Attorney, Agent, or Firm*—April M. Mosby; W. James Brady, III; Frederick J. Telecky, Jr.

(57) ABSTRACT

A codifier/decodifier (CODEC) filter circuit (250) connected in a subscriber line interface circuit (202) includes a transmit section (264, 262, 260) for converting differential voltage audio transmit signals representing voice transmissions from the subscriber instrument (202) into encoded digital data for transmission to the digital switching network. A receive section (254, 252) coupled between the digital switching network and subscriber instrument (202) within CODEC (250) for converting encoded digital data representing voice signals switched through the digital switching network to differential voltage audio receive signals for transmission to the subscriber instrument (202). The subscriber loop and subscriber instrument (202) reflect the digital voltage audio signals to the transmit section (264, 262, 260). An impedance section (258, 256) within CODEC (250) connects between the transmit section (264, 262, 260) and the receive section (254, 252) and is disposed to provide an audio band feedback signal between the transmit section (264, 262, 260) and the receive section (254, 252) for synthesizing a source impedance for the subscriber line that matches the subscriber loop impedance. Impedance section (258, 256) includes an analog impedance scaling network (246) coupled between the transmit section (264, 262, 260) and receive section (254, 252). The impedance section (258, 256) also includes a programmable digital filter (258) coupled to the transmit section (264, 262, 260) having a transfer function equal to:

$$(R_2T)(1+z^{-1})/(R_1(T+2C_2R_2)(1+(T-2R_2C_2)/(T+2R_2C_2)z^{-1}))$$

where $R_2$ is the second subscriber loop impedance, $C_2$ is the subscriber loop capacitance, $R_1$ is the first subscriber loop impedance, T is the sampling rate of the analog-to-digital converter and z is the frequency of the signal. Furthermore, a summer circuit (256) provides feedback between the programmable digital filter (258) and the receive section (254, 252) by summing the single-ended audio receive signals from the digital switching network with the audio band feedback signal output by the programmable digital filter (258).

7 Claims, 4 Drawing Sheets

UNIVERSAL IMPEDANCE MATCHING NETWORK FOR THE SUBSCRIBER LINE INTEGRATED CIRCUITS

This application claims priority under 35 USC § 119(e)(1) of provisional application Ser. No. 60/295,633, filed Jun. 4, 2001.

FIELD OF THE INVENTION

The present invention relates to subscriber line integrated circuits, and, more particularly, to a universal impedance matching network for the subscriber line integrated circuits.

BACKGROUND OF THE INVENTION

Subscriber line interface circuits (SLIC), customarily found in a central office exchange of a telecommunications network, integrate digital switching networks of the central office exchange to the analog subscriber lines. The analog subscriber lines connect to subscriber stations or instruments found at subscriber locations remote from the central office exchange. SLICs function to supply power to a subscriber station and to transmit and receive voice signals between the digital switching network and the subscriber station.

As an interface between the SLIC and the digital switching system, a codifier/decodifier (CODEC) filter translates analog voice signals into encoded digital signals. The CODEC filter converts analog voice signals received from a subscriber line into encoded digital signals. Similarly, The CODEC filter converts encoded digital signals from the digital switching system into analog voice signals for transmission on the subscriber line.

Impedance mismatch at the telephone central office between the subscriber lines/trunks line and the terminating impedance within a digital switching network is well known. The two-to-four wire conversion between the subscriber line and terminating impedance causes this impedance mismatch which results in poor return loss characteristics and reflections or echoes. To correct these deficiencies requires the line impedance and the terminating impedance to be equal in both phase and magnitude over the bandwidth of the telephone channel.

The CODEC filter must effectively and efficiently perform analog-to-digital and digital-to-analog conversion, power level adjustment, and impedance matching for a subscriber line interface circuit.

Passive fixed terminating impedances to date represent a compromise, except at a specific frequency, due to the fact that such compromise impedance is either a series or parallel combination of a resistor and capacitor. Such a simple impedance results in a poor match for the line impedance. Typically, a hybrid which performs two-to-four wire conversion depends upon a relatively close match between the line and the terminating impedances and for optimum performance. Compensating for this mismatch has been attempted in the prior art with balance or "building-out" networks which are a part of the hybrid, and which, for a given line, represents a custom tailoring of the circuit.

The latest approach to provide impedance matching is derived by Advanced Micro Device (AMD) as is shown in FIG. 1. The impedance matching network of subscriber line device block diagram 100 includes an Analog Impedance Scaling Network (AISN) 126, having a programmable analog gain of −0.9375 to +0.9375, and programmable digital filter (Z) 110. Filter 110 is a programmable digital filter providing an additional path and programming flexibility over the AISN 126 to modify the transfer function from the path corresponding to nodes $V_{in}$ and $V_{out}$. This digital line circuit eliminates the previously associated discrete analog components. It also provides automatic digital synthesis of line terminating impedance for any transmission line characteristic, eliminating the previously used analog components. These features make it possible to implement complete electronic hybrid and impedance matching functions as part of an overall CODEC function, enabling these functions to be implemented on a single LSI chip without extensive analog external balancing or adjusting circuitry. This results in a low cost, low power, high density and a highly reliable telecommunications line-circuit. Z-filter 110 has the following transfer function:

$$H_z(z) = z_0 + z_1 z^{-1} + z_2 z^{-2} + z_3 z^{-3} + z_4 z^{-4} + (z_5 z_6 z_7 z^{-1})$$

Software calculates the Z-filter coefficients of digital filter 110 to maximize the return loss. Difficulty, however, lies in the complexity and time associated with the derivation of each Z-filter coefficient.

Thus, there exists a need for CODEC filter that performs impedance matching without the complex calculation of z-filter coefficients.

SUMMARY OF THE INVENTION

To address the above-discussed deficiencies of the subscriber line integrated circuits (SLIC), the present invention teaches a codifier/decodifier (CODEC) filter circuit connected in a subscriber line interface circuit. The SLIC connects to a subscriber instrument using a tip lead and a ring lead of a subscriber loop across which a subscriber loop impedance exists. In addition, the SLIC connects to a digital switching network. The novel CODEC of the present invention includes a transmit section for converting differential voltage audio transmit signals representing voice transmissions from the subscriber instrument into encoded digital data for transmission to the digital switching network. A receive section coupled between the digital switching network and subscriber instrument within the CODEC for converting encoded digital data representing voice signals switched through the digital switching network to differential voltage audio receive signals for transmission to the subscriber instrument. The subscriber loop and subscriber instrument reflect the digital voltage audio signals to the transmit section. An impedance section connects between the transmit section and the receive section and is disposed to provide an audio band feedback signal between the transmit section and the receive section for synthesizing a source impedance for the subscriber line circuit that matches the subscriber loop impedance. The impedance section includes a programmable digital filter coupled to the transmit section having a transfer function equal to:

$$(R_2 T)(1+z^{-1})/(R_1(T+2C_2 R_2)(1+(T-2R_2 C_2)/(T+2R_2 C_2)z^{-1})$$

where $R_2$ is the second subscriber loop impedance, $C_2$ is the subscriber loop capacitance, $R_1$ is the first subscriber loop impedance, T is the sampling rate of the analog-to-digital converter and z is the frequency of the signal. Furthermore, the impedance section includes a summer circuit coupled between the programmable digital filter and the receive section. The summer circuit sums the single-ended audio receive signals from the digital switching network with the audio band feedback signal output by the programmable digital filter.

In another embodiment, the impedance section may include an analog impedance scaling network coupled between the transmit section and receive section.

Advantages of this design include but are not limited to an CODEC having a high performance, simple, cost effective design that does not require software. Using existing parameters categorized by country code for each existing subscriber loop, the digital filter is easily programmed to provide impedance matching between subscriber lines and terminating impedance within a digital switching network.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE PREFERRED EMBODIMENTS

Figure 1:
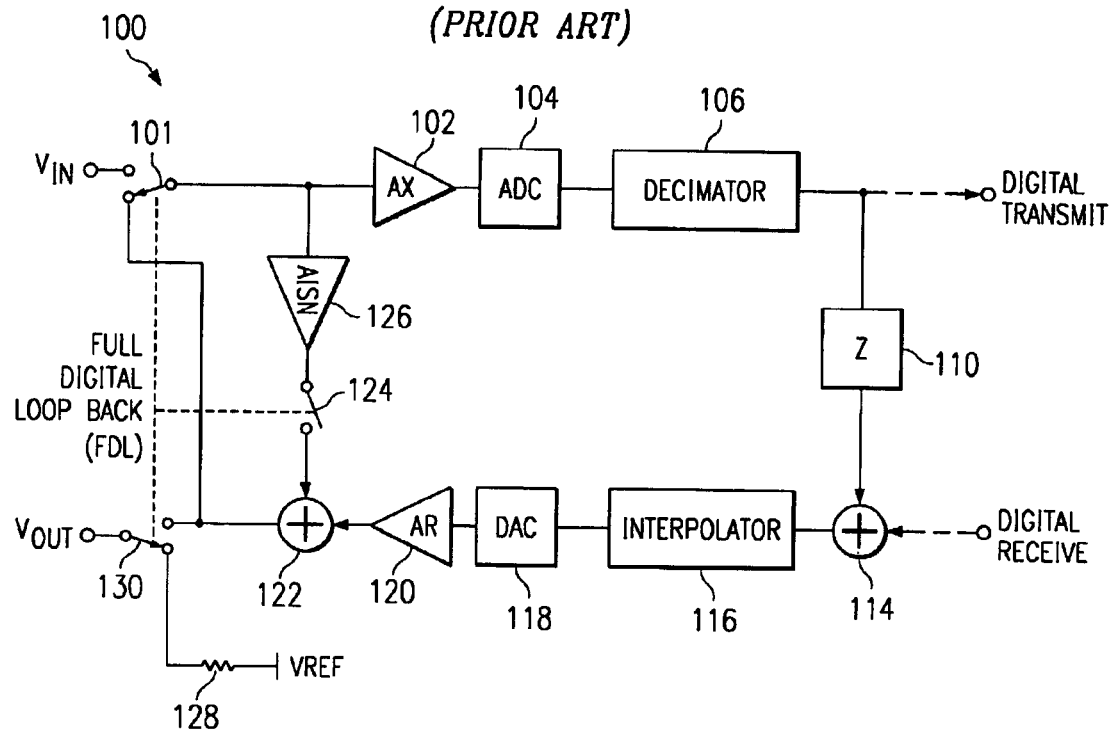
FIG. 1 is a schematic of a known CODEC having a programmable digital filter.

Circuit 200 includes a subscriber loop 202, a SLIC 210, and a CODEC 250 in accordance with the present invention. As shown, SLIC 210 is connected to subscriber instruments using the tip lead TIP and a ring lead RING of a subscriber loop 202 and to CODEC 250 at nodes $V_{RX}$ and $V_{TX}$. CODEC 250 connects to a digital switching network (not shown) at nodes Digital$_{RX}$ and Digital$_{TX}$. CODEC 250 uses a different structure and coefficients than other conventional programmable digital filters.

Subscriber loop 202 represents the subscriber loop impedance. Resistor $R_2$ is the second subscriber loop impedance, capacitor $C_2$ is the subscriber loop capacitance, and resistor $R_1$ is the first subscriber loop impedance. As shown, resistor $R_2$ couples in parallel with capacitor $C_2$, while resistor $R_1$ couples in series with both resistor $R_2$ and capacitor $C_2$. The values of capacitor $C_2$ and resistors $R_1$ and $R_2$ are predetermined and categorized for each country.

A known design for a SLIC 210 is provided to explain operation of CODEC 250 in conjunction with subscriber loop 202. SLIC 210 includes a feedback network including resistors 228, 216, 212, 214, and 222, current mirror 224, and amplifiers 218 and 220 in the feed-forward portion and resistors 234, 236, 238, 240, 242, 232, 230, 246, and 226 and amplifiers 244 and 248 in the feedback portion. The feedforward portion couples between CODEC 250 and subscriber loop 202. The feedback portion couples in parallel to the feedforward portion.

Specifically the feed forward portion includes resistor 228 connected to a first input of current mirror 224. A second input of current mirror 224 couples to ground. A first output of current mirror 224 connects to resistor 216 and a first input of amplifier 218. A second input of amplifier 218 connects to a first input of amplifier 220. The output of amplifier 218 connects to resistor 212 which couples to the node TIP. The output of amplifier 220 also connects to resistor 214 which couples to the node RING. Resistor 222 couples between a second input of amplifier 220 and node RING. The second output of current mirror 224 connects to the second input of amplifier 220.

The feedback portion includes a differential amplifier arrangement including amplifier 244 and resistors 232, 234, 236, 238, 240, and 242. Specifically, resistor 234 connected between the output of amplifier 218 and a first input of amplifier 244. Resistor 236 connects between node RING and the first input of amplifier 244. Resistor 238 connects between the output of amplifier 220 and a second input of amplifier 244. Resistor 240 connects between node RING and the second input of amplifier 244. Resistor 242 connects between the first input of amplifier 244 and the output of amplifier 244. Resistor 232 connects between the second input of amplifier 244 and ground. The feedback portion also includes amplifier 248 having a first and second input and an output. Resistor 230 connects between the output of amplifier 244 and the first input of amplifier 248. The second input of amplifier 248 couples to ground. Resistor 246 connects between the first input of amplifier 248 and the output of amplifier 248. Resistor 226 connects between the output of amplifier 248 and the first input of current mirror 224.

The gain of the transmit amplifier 248, set by resistor $R_s$, determines the programmed impedance of the device. The ground symbols in the model represent AC grounds, not actual DC potentials. The sense amp 244 output voltage $V_{SA}$ is a function of Tip and Ring voltage and load is calculated using:

$$V_{SA} = -(V_T - V_R)10/Z_L \qquad [1]$$

The sense amplifier 244 provides the programmable gain required for impedance synthesis. In addition, the output of this amplifier interfaces to the CODEC transmit input $V_{TX}$, wherein the output voltage is calculated using:

$$V_{TX} = -V_{SA}(R_S/8e3) \qquad [2]$$

Once the impedance matching components are selected using design equations, the above equations provide additional insight as to the expected AC node voltages for a specific Tip and Ring load.

CODEC 250 includes a transmit section having an anti-aliasing filter 264, an analog-to-digital filter (ADC) 262, and an error cancellation filter 260 for converting differential voltage audio transmit signals representing voice transmissions from the subscriber instrument 202 into encoded digital data for transmission to the digital switching network. A receive section having a digital-to-analog (DAC) 254 and a smoothing filter 252 coupled between the digital switching network (not shown) and subscriber instrument 202 within CODEC 250 for converting encoded digital data representing voice signals switched through the digital switching network to differential voltage audio receive signals for transmission to the subscriber instrument 202. The subscriber loop and subscriber instrument 202 reflect the digital voltage audio signals to the transmit section 264, 262 and 260. An impedance section having a programmable digital filter 258 and a summer 256 connects between transmit section 264, 262, and 260 and receive section 254, and 252 and is disposed to provide an audio band feedback signal between the transmit section 264, 262, and 260 and the receive section 254 and 252 for synthesizing a source impedance for the subscriber line that matches the subscriber loop impedance. Impedance section 258 and 256 may include an analog impedance scaling network 246 coupled between the transmit section 264, 262, and 260 and receive section 254 and 252.

Programmable digital filter 258 couples to the transmit section 264, 262, and 260 having a transfer function equal to:

$$(R_2T)(1+z^{-1})/(R_1(T+2C_2R_2)(1+(T-2R_2C_2)/(T+2R_2C_2)z^{-1})$$

where $R_2$ is the second subscriber loop impedance, $C_2$ is the subscriber loop capacitance, $R_1$ is the first subscriber loop impedance, T is the sampling rate of the analog-to-digital converter and z is the frequency of the signal. Summer circuit 256 provides feedback between programmable digital filter 258 and receive section 254 and 252 by summing the single-ended audio receive signals from the digital switching network with the audio band feedback signal output by the programmable digital filter 258.

CODEC 250 in accordance with the present invention allows analog subscriber line characteristics to be easily adjusted through software to address virtually any set offline conditions. Digital filter 258 provides outstanding reliability, no drift in filter response over time or temperature, and superior transmission performance. Filter 258 design puts this level of performance and flexibility into a system in a cost-effective, yet quick, turnaround design.

In an effort to derive the transfer function of the programmable digital filter 258 for the CODEC 250, the best 2-wire return loss is achieved when:

$$R_s = 400 Z_0, \quad [1]$$

where $Z_0$ representing the line loading impedance of single analog subscriber line 202. Substituting impedance $Z_0$ with the components in single analog subscriber line 202, Equation [1] can be rewritten as:

$$R_s = 400 R_1(1+(1/R_1C_2)/(s+1/R_2C_2)) = Z_1 + Z_2, \quad [2]$$

$$\text{where: } Z_1 = 400R, \quad [3]$$

and $$Z_2 = 400(1/C_2)/(s+(1/R_2C_2)). \quad [4]$$

Voltage $V_{TX}$ can be represented using the sensing amplifier voltage $V_{SA}$ as:

$$V_{TX} = -(R_s/8000)V_{SA}$$

$$= -(Z_1/8000)V_{SA} - (Z_2/8000)V_{SA} \quad [5]$$

$$= -(Z_1/8000)V_{SA}(1+Z_2/Z_1) \quad [6]$$

The first term in Equation 5 constitutes the fast path to the impedance matching and can be implemented using an analog impedance scaling network (AISN) such as impedance 246. The second term in Equation 5 constitutes the slow path to the impedance matching and can be implemented using digital filter 258 to achieve better compensation on top of the impedance of the AISN, resistor 246.

The AISN, as indicated by Equation 3, is a pure resistance with the value of $400 \times R_1$, which is used for resistor 246. The transfer function H(z) of digital filter 258, from nodes $V_{TX}$ to $V_{RX}$, is equivalent to $Z_2/Z_1$, as indicated in Equation 6. Thus, using the bilinear transformation, as well as Equations (3) and (4), the transfer function H(z) is derived to be:

$$H(z) = Z_2/Z_1 \quad [7]$$

$$= (R_2T/(R_1(T+2C_2R_2))((1+z^{-1})/(1+(T-2R_2C_2)/(T+2R_2C_2)z^{-1})) \quad [8]$$

where T is the sampling rate of the analog-to-digital converter ADC 262.

Digital filter 258 having a transfer function as prescribed in Equation 8 assumes the non-zero value of resistor $R_1$. For countries such as Sweden having resistor $R_1$ equal to zero, the transfer function must substitute 50 ohm for resistor $R_1$. This approximation introduces some negligible error. Using Sweden's loading model as an example, where $R_1=0$ ohms, $R_2=900$ ohms, and $C_2=60$ pF, the difference in impedance is given in the following table at frequencies of interest.

| Frequency (Hz) | $R_2/C_2$ (ohms) | $50 + R_2/C_2$ (ohms) | relative error (%) |
|---|---|---|---|
| 168 | 897-51i | 947-51i | 5.6 |
| 300 | 890-90i | 940-90i | 5.6 |
| 533 | 871-157i | 921-157i | 5.6 |
| 948 | 815-262i | 865-262i | 5.8 |
| 1687 | 678-388i | 728-388i | 6.4 |
| 3000 | 442-450i | 492-450i | 7.9 |
| 3400 | 386-445i | 436-445i | 8.5 |

It can be seen that the relative errors are less than 9% and negligible.

For countries whose $R_1$ is less than 50 ohm, H(z) is identical to Equation 9, but resistor $R_1$ takes the value of 50 ohm.

Figure 3:
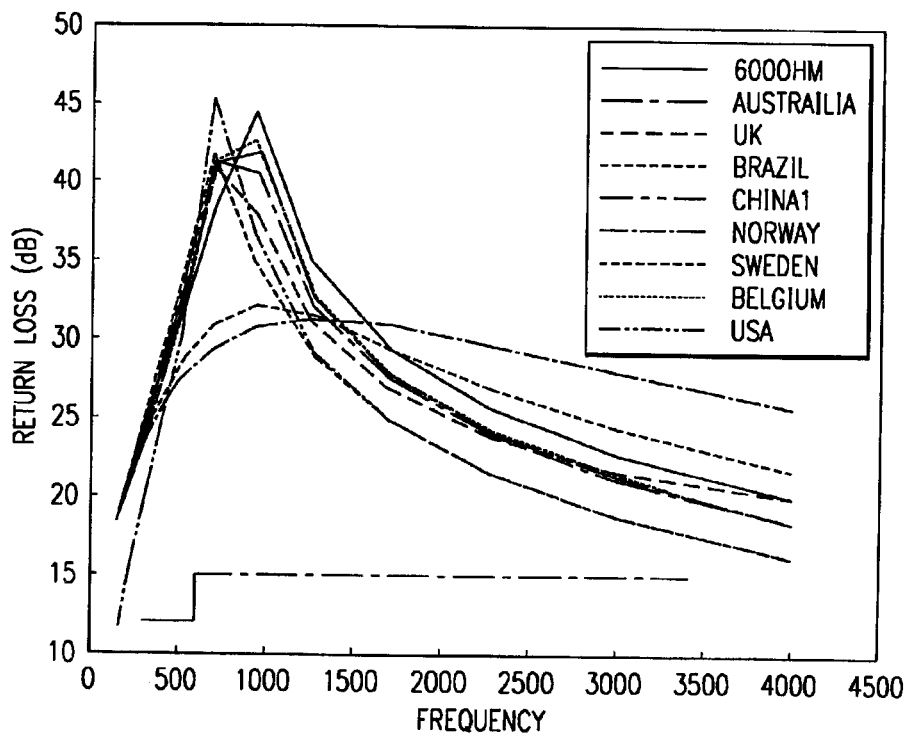
FIG. 3 is a graph of the return-loss performance of the CODEC of FIG. 2 for particular subscriber loop lines.
Figure 2:
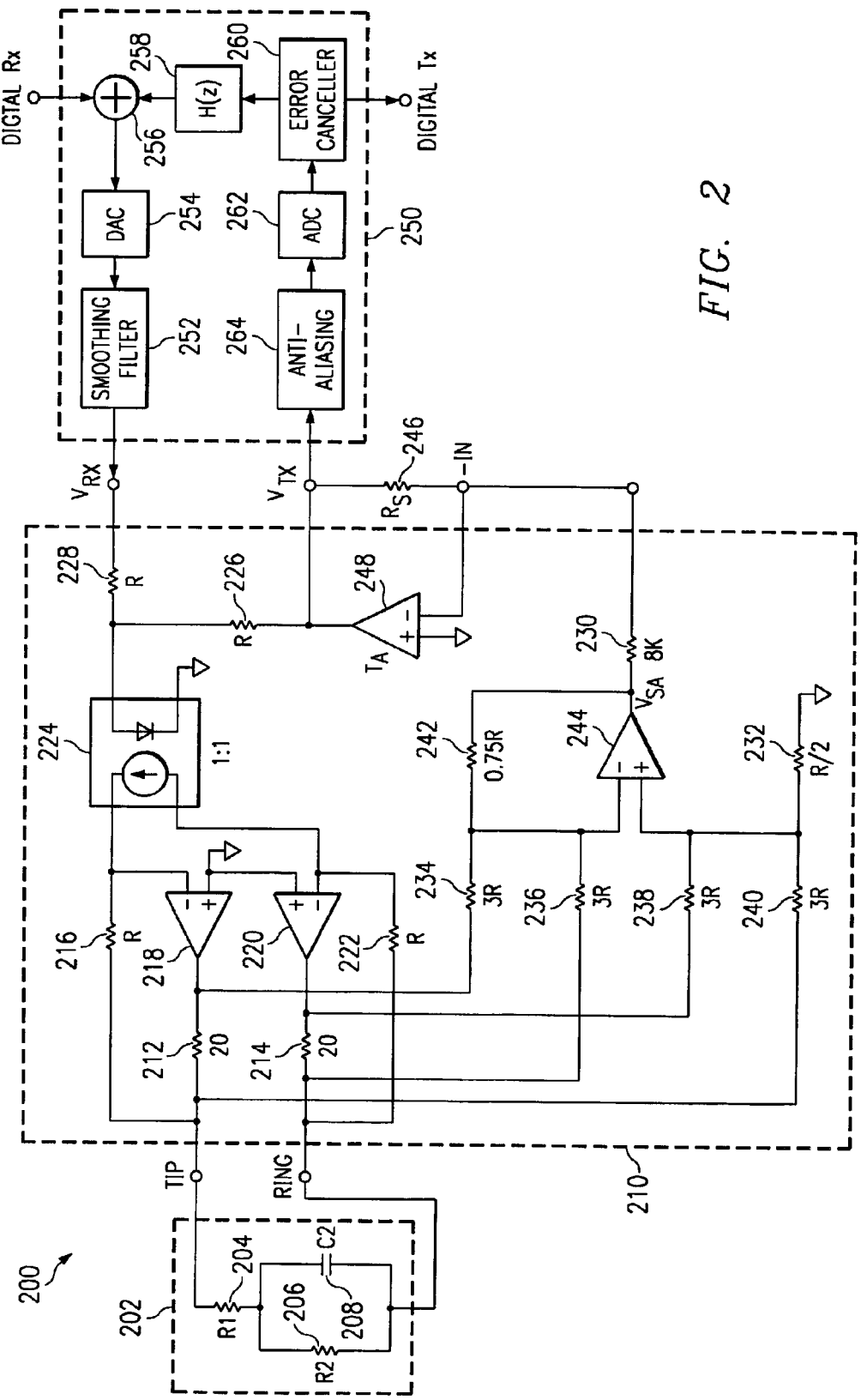
FIG. 2 is a schematic of a first embodiment of a SLIC having a CODEC in accordance with the present invention.

FIG. 3 illustrates the two wire Return loss of the embodiment of FIG. 2 for various countries, all exceeding the specification shown in the dash line.

Figure 4:
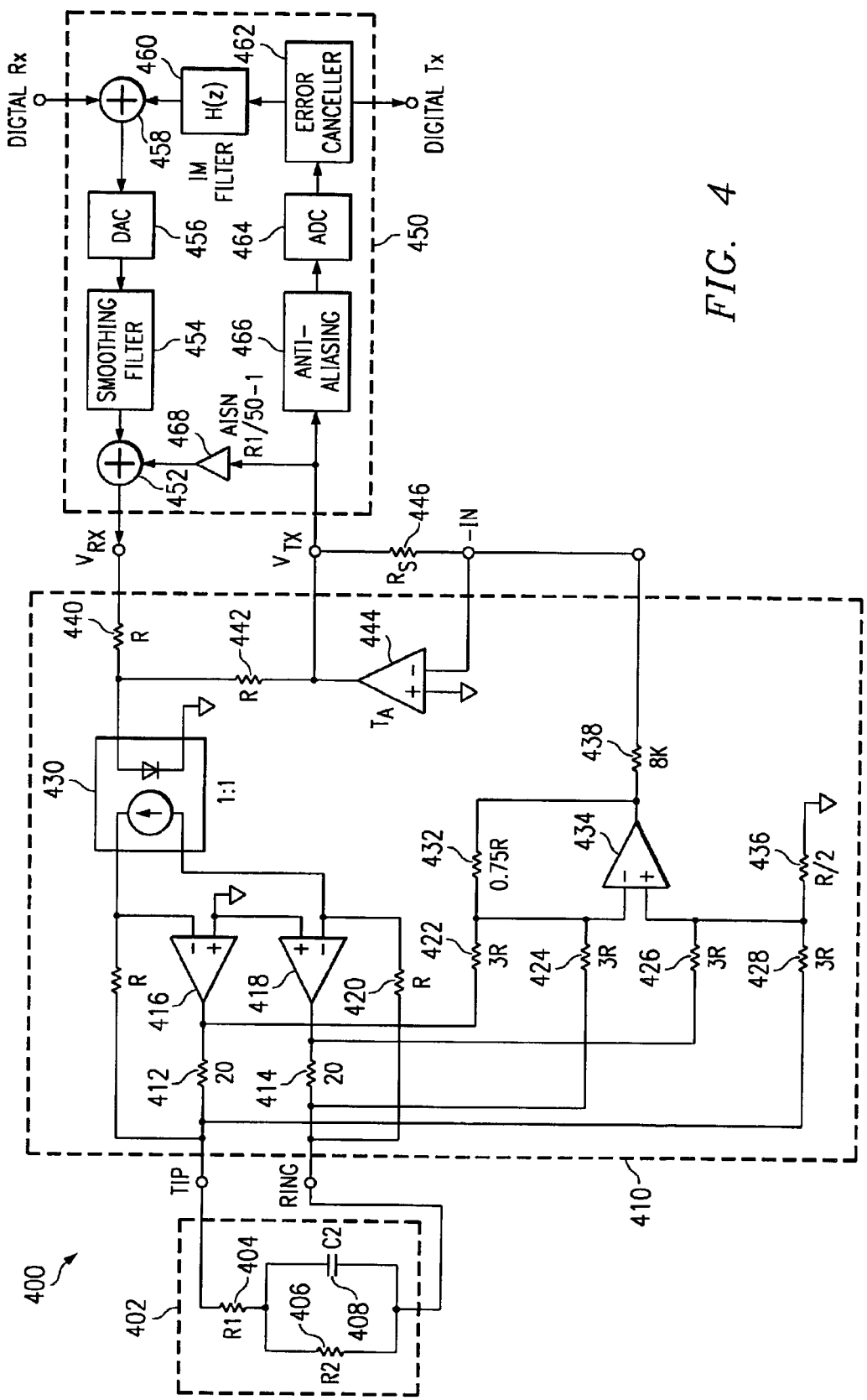
FIG. 4 is a schematic of a second embodiment of a SLIC having a CODEC in accordance with the present invention.

The distinction between the embodiment of FIG. 2 and that of FIG. 4 lies in the placement of the AISN 468. The AISN 246 in FIG. 2 is between nodes $V_{TX}$ and −IN. In various embodiments of circuit 400, where node −IN is not available within CODEC 450, AISN 468 must be configured between the nodes $V_{TX}$ and $V_{RX}$. In addition, AISN 468 is $400R_1$, with $R_1$ greater than or equal to 50 ohms, 120−2Rp with Rp=35, where the resistance between nodes VTX and −IN is 50 ohms. The voltage at node $V_{TX}$ is scaled up by a factor of $R_1/50$. As a result, the transfer function H(z) is scaled up by a factor of $R_1/50$. AISN 468 is built with the gain of $R_1/50−1$ where one is subtracted from 50 to take out the intrinsic path between the output of amplifier 444 to node $V_{RX}$.

Figure 5:
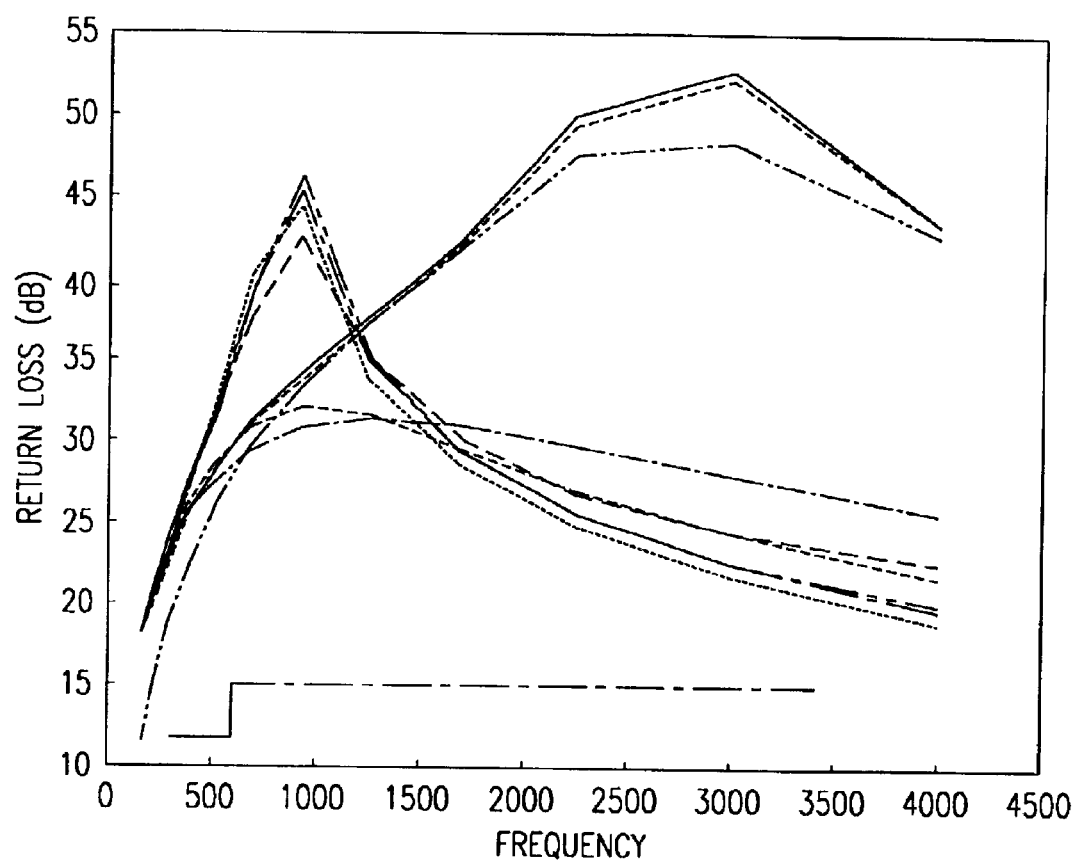
FIG. 5 is a graph of the return-loss performance of the CODEC of FIG. 4 for particular subscriber loop lines.

FIG. 5 shows the simulated 2 wire return losses for the embodiment of circuit 400. Better return losses are achieved in FIG. 5 for circuit 400 than that displayed in FIG. 3 for circuit 200 since the feedback amount of the transmit amplifier 444 is greater than that of transmit amplifier 248 (i.e. $\frac{1}{50} > 1/R_1$). Larger feedback widens the bandwidth of the amplifier, making it a more ideal amplifier. For countries like Brazil and USA whose $R_1$ is large, the difference is more obvious, especially in the high frequency regions.

Advantages of this design include but are not limited to an CODEC having a high performance, simple, cost effective design that does not require software. Using existing parameters categorized by country code for each existing subscriber loop, the digital filter is easily programmed to provide impedance matching between subscriber lines and terminating impedance within a digital switching network.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A codifier/decodifier filter circuit connected in a subscriber line interface circuit, the subscriber line interface circuit connected to a subscriber instrument via a tip lead and a ring lead of a subscriber loop across which a subscriber loop impedance exists and to a digital switching network, the codifier/decodifier filter circuit, comprising:

a transmit section for converting differential voltage audio transmit signals representing voice transmissions from the subscriber instrument into encoded digital data for transmission to the digital switching network;

a receive section for converting encoded digital data representing voice signals switched through the digital switching network to differential voltage audio receive signals for transmission to the subscriber instrument;

the subscriber loop and subscriber instrument being operable to reflect the digital voltage audio signals to the transmit section;

an impedance section connected between the transmit section and the receive section disposed to provide an audio band feedback signal between the transmit section and the receive section for synthesizing a source impedance for the subscriber line circuit that matches the subscriber loop impedance;

wherein the impedance section comprises a programmable digital filter coupled to the transmit section having a transfer function equal to $$H(z) = \frac{(R_2 T)(1 + z^{-1})}{\left(R_1(T + 2C_2 R_2)\left(1 + \frac{(T - 2R_2 C_2)}{(T + 2R_2 C_2) z^{-1}}\right)\right)}$$

where $R_2$ is the second subscriber loop impedance, $C_2$ is the subscriber loop capacitance, $R_1$ is the first subscriber loop impedance, T is the sampling rate of the analog-to-digital converter and z is the frequency of the signal, and a summer circuit coupled between the programmable digital filter and the receive section, the summer circuit arranged to sum the single-ended audio receive signals from the digital switching network with the audio band feedback signal output by the programmable digital filter.

2. The codifier/decodifier filter circuit as recited in claim 1, wherein the transmit section comprises:

an anti-aliasing section;

an analog-to-digital converter section coupled to the anti-aliasing section; and an error cancellation section coupled to the analog-to-digital converter to reshape the differential voltage audio transmit signals output by the transmit section and to apply the reshaped differential voltage audio transmit signals to the receive section, canceling any reflected differential voltage audio transmit signals not completely transferred to the subscriber loop.

3. The codifier/decodifier filter circuit as recited in claim 1, wherein the receive section comprises:

a digital-to-analog converter; and a smoothing filter coupled to the digital-to-analog converter.

4. The codifier/decodifier filter circuit as recited in claim 1, wherein the impedance section further includes an analog impedance scaling network coupled between the transmit section and receive section.

5. The codifier/decodifier filter circuit as recited in claim 4, wherein the analog impedance scaling network is a resistor.

6. The codifier/decodifier filter circuit as recited in claim 5, wherein the resistor is 50 Ω.

7. A method for transferring data within a codifier/decodifier filter circuit connected in a subscriber line interface circuit from a subscriber instrument having a tip lead and a ring lead of a subscriber loop across which a subscriber loop impedance exists to a digital switching network, comprising the steps of:

converting a differential voltage audio transmit signal representing a voice transmission received by a transmit section of the codifier/decodifier filter circuit from the subscriber instrument into encoded digital data for transmission to the digital switching network;

synthesizing a source impedance for the subscriber line circuit that matches the subscriber loop impedance using an impedance section coupled to the transmit section, the impedance section having a programmable digital filter having a transfer function equal to:

$$H(z) = \frac{(R_2 T)(1 + z^{-1})}{\left(R_1(T + 2C_2 R_2)\left(1 + \frac{(T - 2R_2 C_2)}{(T + 2R_2 C_2) z^{-1}}\right)\right)}$$

where $R_2$ is the second subscriber loop impedance, $C_2$ is the subscriber loop capacitance, $R_1$ is the first subscriber loop impedance, T is the sampling rate of the analog-to-digital converter and z is the frequency of the signal;

summing the synthesized source impedance with encoded digital data representing a voice signal switched through the digital switching network and received by a receive section of the codifier/decodifier filter circuit; and converting the sum into a differential voltage audio receive signal for transmission to the subscriber instrument.

* * * * *